US008545586B2

(12) United States Patent
Takeshima et al.

(10) Patent No.: US 8,545,586 B2

(45) Date of Patent: Oct. 1, 2013

(54) AIR CLEANER ELEMENT HOLDING STRUCTURE

(75) Inventors: Masao Takeshima, Wako (JP); Kihoko Kaita, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 595 days.

(21) Appl. No.: 11/877,286

(22) Filed: Oct. 23, 2007

(65) Prior Publication Data

US 2008/0098701 A1 May 1, 2008

(30) Foreign Application Priority Data

Oct. 31, 2006 (JP) ................................ 2006-296919

(51) Int. Cl.
*B01D 46/00* (2006.01)

(52) U.S. Cl.
USPC ................ 55/385.3; 55/486; 55/498; 55/510; 123/198 E

(58) Field of Classification Search
USPC ............ 55/385.1, 385.2, 385.3, 385.4, 385.5, 55/385.6, 385.7, 490, 492, 502, 498, 510, 55/521, DIG. 28, DIG. 31, DIG. 20; 128/198 E; 210/176, 323.1, 323.2, 326, 342, 348, 402, 210/438, 445, 450, 451, 452, 453, 454, 455, 210/462, 497.01, 497.3
See application file for complete search history.

(56) References Cited

U.S. PATENT DOCUMENTS 3,577,632 A * 5/1971 Hofmeister ................... 438/125
3,612,024 A * 10/1971 Bandimere ..................... 55/312
4,071,004 A * 1/1978 Ostergaard .................... 123/539
4,074,985 A * 2/1978 Willas ............................. 55/498
4,268,289 A * 5/1981 Polaner ........................... 55/486
4,663,041 A * 5/1987 Miyagi et al. .............. 210/493.2
5,377,632 A * 1/1995 Aronsson et al. ......... 123/198 E
5,505,753 A * 4/1996 Heysek ........................... 96/416
5,871,001 A * 2/1999 Pelkey .......................... 123/542
6,162,269 A * 12/2000 Greenlees et al. ........... 55/385.1
6,261,333 B1 * 7/2001 Dickson ....................... 55/385.3
6,287,354 B1 * 9/2001 Nozaki ........................ 55/385.3
6,387,142 B1 * 5/2002 Pieciak et al. .................. 55/493
6,863,758 B1 * 3/2005 Altmeyer et al. ............... 156/91
6,994,742 B2 * 2/2006 Barris et al. ..................... 55/487
7,384,440 B2 * 6/2008 Takano et al. ................... 55/493
7,572,310 B2 * 8/2009 Gieseke et al. ................. 55/498
7,604,677 B2 * 10/2009 Tsuruta et al. ............... 55/385.3

(Continued)

FOREIGN PATENT DOCUMENTS

JP 62-74790 A 4/1987

*Primary Examiner* — Duane Smith
*Assistant Examiner* — Thomas McKenzie
(74) *Attorney, Agent, or Firm* — Westerman, Hattori, Daniels, Adrian, LLP

(57) ABSTRACT

The present invention relates to an air cleaner element holding structure for an air cleaner device for use in filtering intake air for an engine. The air cleaner device includes an air cleaner element and an element holder, provided in an air cleaner case. The air cleaner element includes at least a pair of element support plates and the element holder includes at least a pair of circular plates. The air cleaner case includes an intake duct facing an inner circumferential side of the air cleaner element for conducting air thereto. Each of the support plates has an outer diameter that is larger than that of the air cleaner element. The element support plates support the air cleaner element in such a manner that both ends, in the axial direction, of the element holder contact an inside surface, in the axial direction, of the element support plates.

6 Claims, 6 Drawing Sheets

(56) References Cited

U.S. PATENT DOCUMENTS

| | | | | |
|---|---|---|---|---|
| 7,806,953 | B2 * | 10/2010 | Schlauch | 55/385.1 |
| 7,867,311 | B1 * | 1/2011 | Connor et al. | 55/482 |
| 2004/0025810 | A1 * | 2/2004 | Davis et al. | 123/41.7 |
| 2004/0050766 | A1 * | 3/2004 | Jiang | 210/232 |
| 2004/0163372 | A1 * | 8/2004 | Nguyen | 55/497 |
| 2004/0200354 | A1 * | 10/2004 | Barris et al. | 95/273 |
| 2005/0193695 | A1 * | 9/2005 | Holmes et al. | 55/482 |
| 2005/0274666 | A1 * | 12/2005 | Maxwell et al. | 210/450 |
| 2006/0196359 | A1 * | 9/2006 | Gillingham et al. | 95/273 |

* cited by examiner

AIR CLEANER ELEMENT HOLDING STRUCTURE

FIELD OF THE INVENTION

The present invention relates to an air cleaner element holding structure. In addition, the present invention relates to an element holding structure for an air cleaner device for use in filtering an intake air for an engine of a vehicle.

BACKGROUND OF THE INVENTION

In a conventional element holding structure for an air cleaner device in which a wet air cleaner element and an element holder for supporting the element are accommodated in an air cleaner case having an intake duct, the air cleaner element has a cylindrical shape, and the intake duct is allowed to face the outer circumferential side of the element in the air cleaner case, so that the outer circumferential side of the element is defined as a dirty side (intake air upstream side) and the inner circumferential side thereof is defined as a clean side (intake air downstream side), and the air cleaner element is held in the air cleaner case through the element holder arranged on the inner circumferential side of the element (e.g., JP-A No. S62-074790). The element holder also functions as a flame trap (spark arrester) by which flame (backfire) and the like from an engine are prevented from reaching the air cleaner element.

In the case of an air cleaner device of, for example, a multi-cylinder engine, it is desirable in some cases that the inner circumferential side of the air cleaner element in a cylindrical shape is defined as a dirty side and the outer circumferential side thereof is defined as a clean side. However, there is a problem in the conventional structure because an additional flame trap needs to be provided on the outer circumferential side of the element, and thus the number of components and steps for maintenance are increased.

Accordingly, one object of the present invention is to reduce the number of components and steps for maintenance in an element holding structure for an air cleaner device in which the inner circumferential side of a wet and cylindrical air cleaner element is defined as a dirty side and the outer circumferential side thereof is defined as a clean side.

SUMMARY OF THE INVENTION

One aspect of the present invention provides an air cleaner element holding structure for an air cleaner device (for example, an air cleaner device 11 in the embodiment) in which a wet and cylindrical air cleaner element (for example, an air cleaner element 61 in the embodiment) and an element holder (for example, an element holder 66 in the embodiment) for supporting the element are accommodated in an air cleaner case (for example, an air cleaner case 51 in the embodiment) having an intake duct (for example, an intake duct 52 in the embodiment). The air cleaner element has element support parts (for example, element support parts 64 in the embodiment) in a flange shape at both ends in the axis direction, and allows the intake duct to face the inner circumferential side of the element, so that the inner circumferential side is defined as a dirty side, and the outer circumferential side is defined as a clean side. The element holder has a cylindrical shape which covers the outer circumference of the air cleaner element, and supports the air cleaner element in such a manner that both ends, in the axis direction, of the holder are allowed to abut on the insides, in the axis direction, of the element support parts. The air cleaner case holds the element holder and the air cleaner element by sandwiching the element holder, together with the element support parts, with a case body (for example, a case body 54 in the embodiment) and a lid (for example, an upper lid 55 in the embodiment).

Accordingly, the element holder covers the outer circumferential side of the air cleaner element, so that the element holder can be functioned as a flame trap, and the number of components can be suppressed without a need of a special flame trap. Also, by detaching the upper lid of the air cleaner case, the air cleaner element and the element holder are integrally detached, and thus the maintenance can be easily performed.

Another aspect of the present invention provides an air cleaner element holding structure, wherein the element support parts are formed by using elastic members, and are provided integrally with an element body (for example, an element body 62 in the embodiment).

Accordingly, spaces between the air cleaner case and the element body can be sealed through the element support parts.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
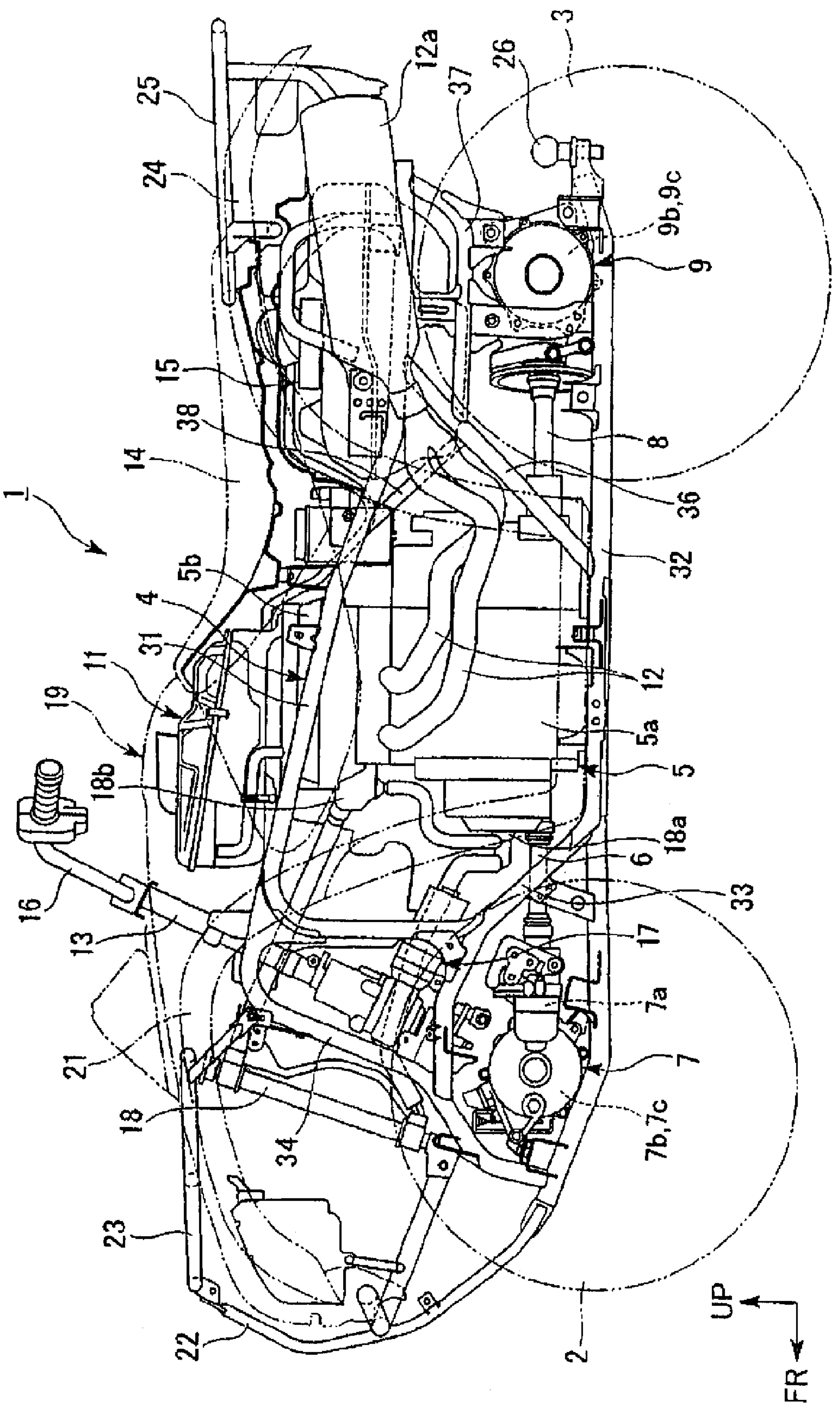
FIG. 1 is a side view of a saddle-ride type four-wheeled vehicle of the present invention.

Hereinafter, an embodiment of the present invention will be described with reference to the drawings. It should be noted that the directions of front, rear, left, right, and the like in the following description are the same as those of a vehicle unless otherwise described. Further, arrows FR, LH, and UP in the drawings indicate the front, left, and upper of the vehicle, respectively.

A saddle-ride type four-wheeled vehicle (vehicle) 1 shown in FIG. 1 includes left and right front wheels 2 and rear wheels 3, all of which are low-pressure balloon tires each having a relatively large diameter, in the front and rear of the downsized and lightweight vehicle body, and is configured as an ATV (All Terrain Vehicle) in which the running through performance on an irregular terrain is enhanced by securing a large ground clearance.

A body frame 4 of the saddle-ride type four-wheeled vehicle 1 forms a long box structure extending in the front-rear direction at a middle portion in the vehicle-width direction (left-right direction). An independent front suspension (not shown) is supported at a front portion of the body frame 4, and an independent rear suspension (not shown) is similarly supported at a rear portion thereof.

An engine (internal combustion engine) 5 as a power plant of the vehicle is mounted at a substantially middle portion of the body frame 4. The engine 5 is, for example, a water-cooled two-cylinder engine, and is vertically laid out so that a rotational axis line of a crankshaft is directed in the front-rear direction. A crankcase 5*a* configuring a lower portion of the engine 5 also serves as a transmission case, and front and rear propeller shafts 6 and 8 are derived from the lower front side and the lower rear side of the crankcase 5*a* toward the front and rear, respectively.

The respective propeller shafts 6 and 8 allow for power transmission to the left and right front wheels 2 and rear wheels 3 through front and rear final assemblies 7 and 9 supported at the front lower side and the rear lower side of the body frame 4, respectively, and through a drive shaft (not shown). Specifically, a rotational drive power from the engine 5 is output to the respective propeller shafts 6 and 8 through a transmission (not shown) in the crankcase 5*a,* and then is transmitted to the left and right front wheels 2 and rear wheels 3 through the respective final assemblies 7 and 9, and the like.

A two-wheel-drive/four-wheel-drive switching mechanism 7*a* by which a rotational drive power from the front propeller shaft 6 can be connected or disconnected is accommodated in a rear portion of a casing of the front final assembly 7, and a differential mechanism 7*b* which can absorb a difference in rotational speed between left and right drive shafts (the left and right front wheels 2), and a differential lock switching mechanism 7*c* which can lock the differential are accommodated in a front portion of the casing. On the other hand, a differential mechanism 9*b* which can absorb a difference in rotational speed between left and right drive shafts (the left and right rear wheels 3), and a differential lock switching mechanism 9*c* which can lock the differential are accommodated in a casing of the rear final assembly 9.

A cylinder part 5*b* is provided in an erect manner on the crankcase 5*a* of the engine 5, and an air cleaner device I1 for engine intake is located above the cylinder part 5*b*. Outside air filtered in the air cleaner device 11 is taken in the inside of the cylinder from the right side of the cylinder part 5*b* through a throttle body (not shown). Exhaust air from the inside of the cylinder is taken to the outside of the cylinder through exhaust pipes 12 connected to the left side of the cylinder part 5*b*. The exhaust pipes 12 are bent on the left side of the cylinder part 5*b* to extend to the rear, and are connected to a silencer 12*a* arranged on the rear left side of the vehicle body.

A steering shaft 13, the air cleaner device 11, and a saddle-ride type seat 14 for a rider are positioned, in the order from the front side, at upper portions of the body frame 4, and a fuel tank 15 is arranged below a rear portion of the seat 14. A bar-type handlebar 16 is attached to an upper end of the steering shaft 13, knuckles (not shown) of the left and right front wheels 2 are coupled to a lower end of the steering shaft 13 through left and right tie rods and the like, and a steering angle can be applied to the left and right front wheels 2 by rotational operation of the handlebar 16.

An electric motor-integrated actuator unit 17 is provided at a lower portion of the steering shaft 13, so that an electric power steering device for applying a steering assist power to a steering system by using the electric motor as a drive source is configured. A radiator 18 for cooling the engine is arranged in front of a lower portion of the steering shaft 13. It should be noted that the reference numerals 18*a* and 18*b* in the drawing illustrate a water pump provided on the front side of the crankcase 5*a* and a thermostat provided on the front side of the cylinder part 5*b* of the engine 5, respectively.

A front vehicle body cover 19 made of resin which appropriately covers a front portion of the vehicle body, front fenders 21 similarly made of resin which cover the left and right front wheels 2 from the above to the rear, and a front protector 22 and a front carrier 23, both of which are mainly made of steel are attached to front portions of the body frame 4. Further, rear fenders 24 made of resin which cover the left and right rear wheels 3 from the above to the front, and a rear carrier 25 and a trailer hitch 26, both of which are mainly made of steel are attached to rear portions of the body frame 4.

Figure 2:
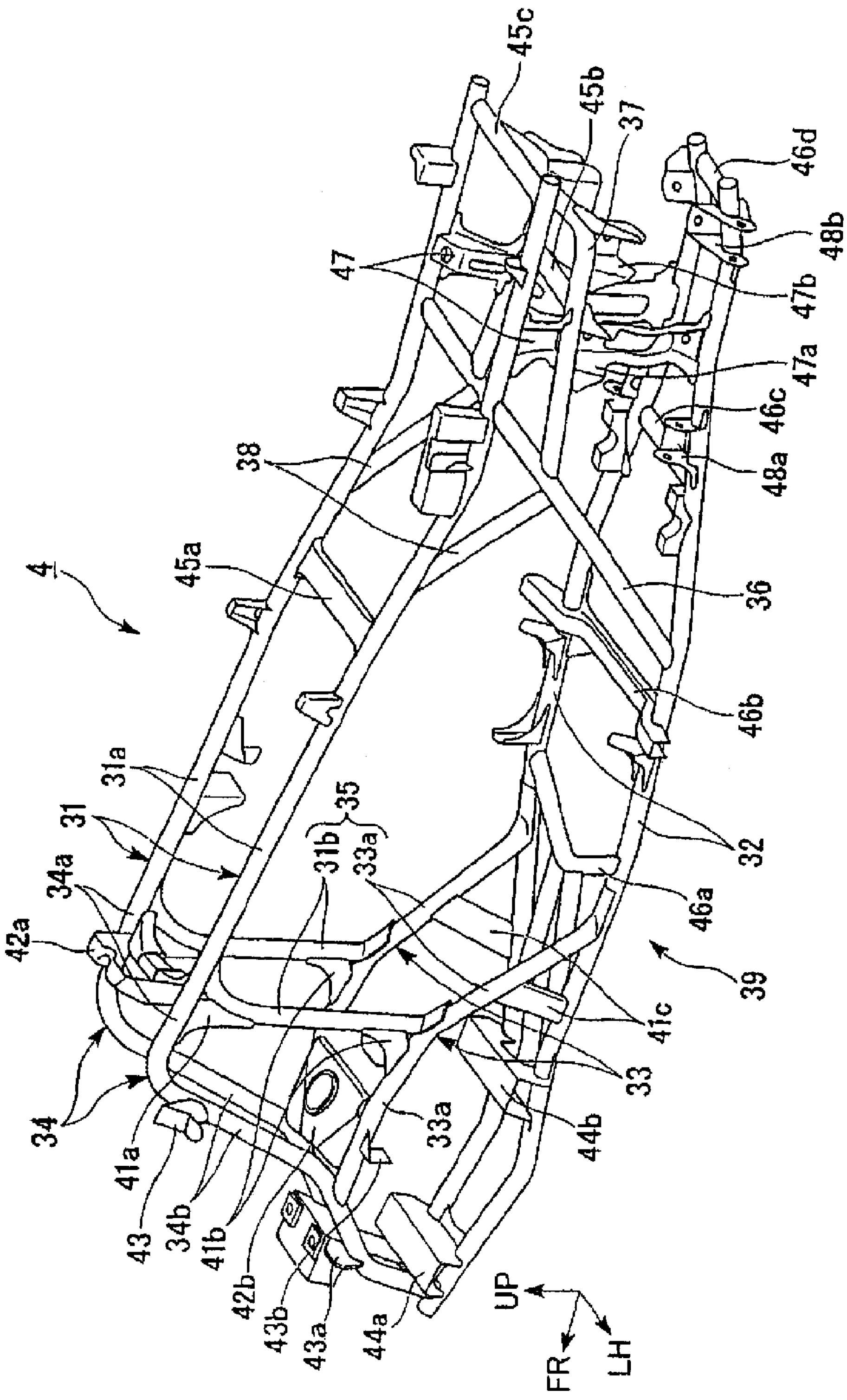
FIG. 2 is a perspective view of a body frame of the saddle-ride type four-wheeled vehicle.

With reference to FIG. 2, the body frame 4 is formed by integrally coupling a plurality of kinds of steel materials by welding, and the like. Specifically, the body frame 4 forms a pair of left and right closed-loop structures by using left and right upper frames 31 and left and right lower frames 32, and the like. By coupling the closed-loop structures to each other through a plurality of cross members, a long box structure extending in the front-rear direction is formed at a middle portion in the vehicle-width direction.

Each upper frame 31 includes an upper inclined part 31*a* which extends slightly downward to the rear on the outer side of an upper portion of the body frame 4 and a front drooping part 31*b* which extends downward from a front end of each upper inclined part 31*a,* and is integrally formed by bending a single steel pipe.

On the other hand, each lower frame 32 is arranged in a substantially horizontal direction on the outer side of a lower portion of the body frame 4, and is integrally formed by bending a single steel pipe. The lower frames 32 are moderately bent so that a distance between intermediate portions in the front-rear direction becomes maximum, and a distance between front portions and a distance between rear portions are reduced. A front end and a rear end of each lower frame 32 are bent upward to the front and upward to the rear, respectively.

A front lower sub-frame 33 extends upward to the front from the front side of an intermediate portion of each lower frame 32. Each front lower sub-frame 33 is formed in a bent manner so that a front inclined part 33*b* thereof is moderately inclined as compared to a rear inclined part 33*a* thereof.

A front sub-frame 34 extends toward a front end of each lower frame 32, while being appropriately bent from the front side of the upper inclined part 31*a* of each upper frame 31. Each front sub-frame 34 forms an upper inclined part 34*a* extending substantially in parallel to the upper inclined part 31*a* from the front side of the upper inclined part 31*a* of each upper frame 31, and then forms a front drooping part 34*b* which is bent downward to extend diagonally downward to the front. Each front drooping part 34 forms a crank shape in such a manner that each lower side thereof is moderately changed to the front to reach a front end of the lower frame 32.

A front end of each front lower sub-frame 33 is connected to the crank-shaped portion of the front drooping part 34*b* of each front sub-frame 34 at the rear side, and a lower end of the front drooping part 31*b* of each upper frame 31 is connected to an intermediate portion, in the front-rear direction, of each front lower sub-frame 33 at the upper side. It should be noted that a region configured by connecting the front drooping part 31*b* of each upper frame 31 to the rear inclined part 33*a* of each front lower sub-frame 33 is referred to as a front-side down frame part 35 in some cases.

A rear support frame (hereinafter, referred to as a rear-side down frame in some cases) 36 which is inclined upward to the rear is provided between a rear portion of each upper frame 31 and the rear side of an intermediate portion of each lower frame 32. A rear sub-frame 37 extends to the rear from an upper portion of each rear support frame 36, and a rear end of each rear sub-frame 37 is bent upward to be connected to a rear end of each upper frame 31 at the lower side. A rear gusset frame 38 which is inclined upward to the rear is provided between an upper portion of each rear support frame 36 and an intermediate portion of each upper frame 31.

The upper frames 31, the front-side down frame parts 35, the lower frames 32, and the rear-side down frames 36 form a pair of left and right closed-loop structures, the inside of which configures a main frame part 39 for supporting the engine 5.

It should be noted that the reference numeral 41 a denotes an upper gusset provided between a bent portion between the upper inclined part 31 a and the front drooping part 31*b* of each upper frame 31, and the upper inclined part 34*a* of each front sub-frame 34, the reference numeral 41*b* denotes a middle gusset provided between the front drooping part 31*b* of each upper frame 31 and the front inclined part 33*b* of each front lower sub-frame 33, the reference numeral 41*c* denotes a lower gusset provided between the rear inclined part 33*a* of each front lower sub-frame 33 and a front portion of each lower frame 32, the reference numeral 42*a* denotes a bracket for supporting an upper portion of the steering shaft 13 provided between the upper inclined parts 34*a* of the front sub-frames 34, and the reference numeral 42*b* denotes a plate for supporting a lower portion of the steering shaft 13 provided between the front inclined parts 33*b* of the front lower sub-frames 33.

Further, the reference numeral 43 denotes a bracket for supporting an upper portion of a cushion, fixed to the front drooping part 34*b* of each front sub-frame 34, the reference numeral 43*a* denotes a cross member for supporting a front portion of an upper arm, provided between the crank-shaped portions of the front drooping parts 34*b* of the front sub-frames 34, the reference numeral 43*b* denotes a bracket for supporting a rear portion of the upper arm, fixed to the front inclined part 33*b* of each front lower sub-frame 33, the reference numeral 44*a* denotes a cross member for supporting a front portion of a lower arm, provided between front ends of the lower frames 32, the reference numeral 44*b* denotes a cross member for supporting a rear portion of the lower arm, provided between front portions of the lower frames 32.

Furthermore, the reference numeral 45*a* denotes a center upper-cross-member provided between intermediate portions of the upper frames 31, the reference numeral 45*b* denotes a rear upper-cross-member provided between intermediate portions of the rear sub-frames 37, the reference numeral 45*c* denotes a rear end upper-cross-member provided between rear ends of the upper frames 31, the reference numeral 46*a* denotes a center lower-cross-member provided between the front sides of intermediate portions of the lower frames 32, the reference numeral 46*b* denotes a step-part cross member provided between the rear sides of intermediate portions of the lower frames 32, the reference numeral 46*c* denotes a rear lower-cross-member provided between rear portions of the lower frames 32, and the reference numeral 46*d* denotes a rear end lower-cross-member provided between rear ends of the lower frames 32.

Further, the reference numeral 47 denotes a bracket for supporting an upper portion of the cushion, provided between a rear portion of each upper frame 31 and an intermediate portion of each rear sub-frame 37, the reference numeral 47*a* denotes a bracket for supporting a front portion of the upper arm, provided between an intermediate portion of each rear sub-frame 37 and a rear portion of each lower frame 32, the reference numeral 47*b* denotes a bracket for supporting a rear portion of the upper arm, fixed to a rear portion of each rear sub-frame 37, the reference numeral 48*a* denotes a bracket for supporting a front portion of the lower arm, fixed to a rear portion of each lower frame 32, and the reference numeral 48*b* denotes a bracket for supporting a rear portion of the lower arm, fixed to a rear end of each lower frame 32.

Figure 3:
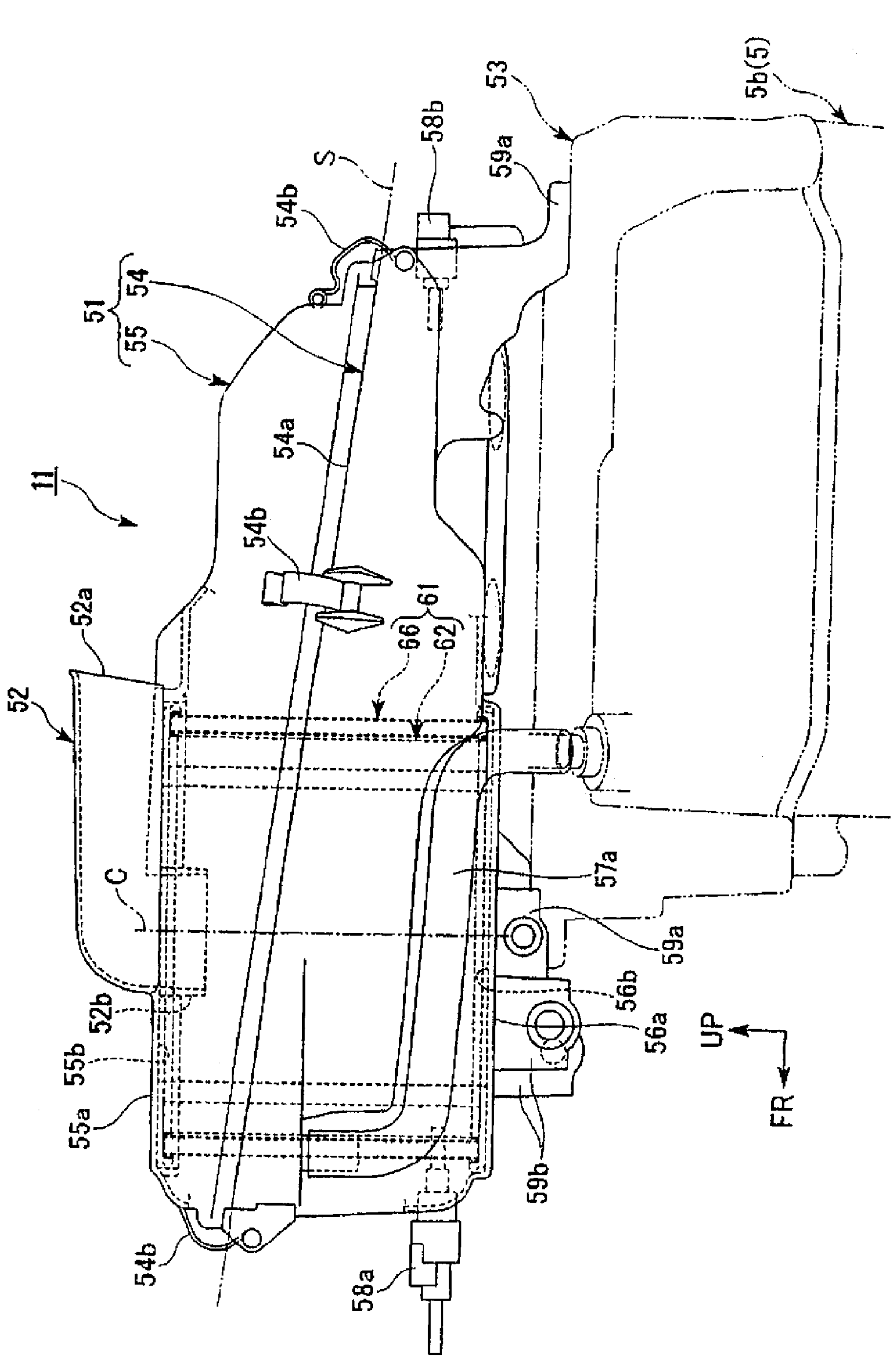
FIG. 3 is a side view of an air cleaner device of the saddle-ride type four-wheeled vehicle.
Figure 4:
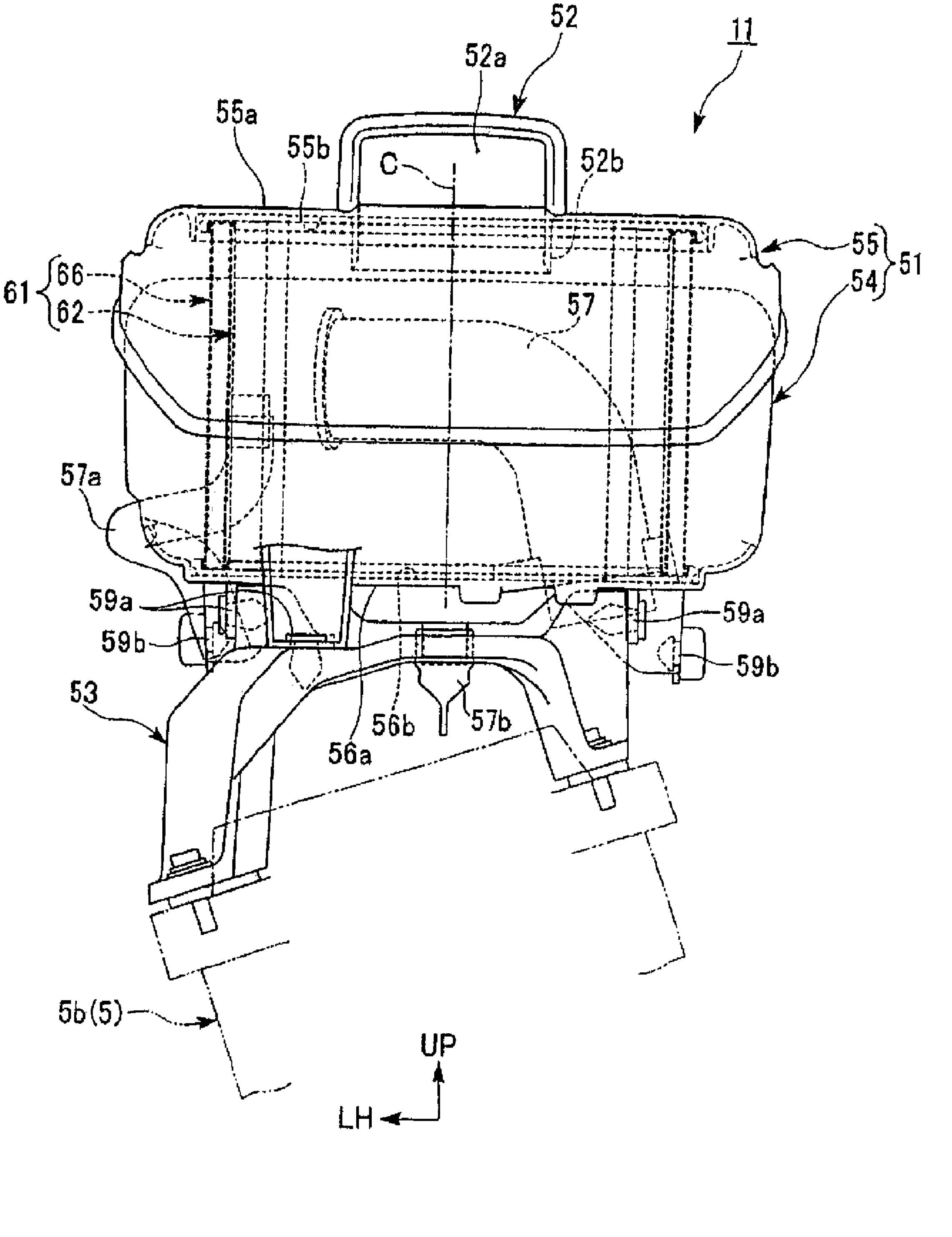
FIG. 4 is a rear view of the air cleaner device.

As shown in FIGS. 3 and 4, the air cleaner device 11 has a basic configuration in which an air cleaner element (hereinafter, referred to simply as an element in some cases) 61 and an element holder 66 for holding the element are attachably and detachably accommodated in an air cleaner case 51 having an intake duct 52, and is elastically supported by the cylinder part 5*b* (the cylinder head or head cover) of the engine 5 through a support frame 53 made of, for example, a steel sheet, a plurality of rubber bushes and the like.

The air cleaner case 51 is made of, for example, synthetic resin, and is formed in a relatively-long box shape extending in the front-rear direction. The air cleaner case 51 is divided into a case body 54 which is open upward and an upper lid 55 which is open downward and is relatively shallow in the up-down direction. An upper opening 54*a* of the case body 54 is formed along a dividing plane S which is inclined downward to the rear, and the upper opening 54*a* can be closed with the upper lid 55. A plurality of plate clips 54*b* in a C-shape made of spring steel and the like are provided at the circumference of the case opening in the case body 54, and the upper lid 55 can be detachably attached to the case body 55 through the plate clips.

The intake duct 52 is integrally formed with a front upper wall 55*a*, as a part of the intake duct 52, of the air cleaner case 51 (the upper lid 55). In the intake duct 52, an intake port 52*a* which is an intake air upstream end is open to the rear on the upper side of an intermediate portion, in the front-rear direction, of the air cleaner case 51. The intake duct 52 extends to the front from the intake port 52*a*, and then forms an intake passage which is bent downward. A collar part 52*a* which penetrates the front upper wall 55*a* to protrude inside the air cleaner case 51 is formed on the intake air downstream side of the intake duct 52.

Figure 5:
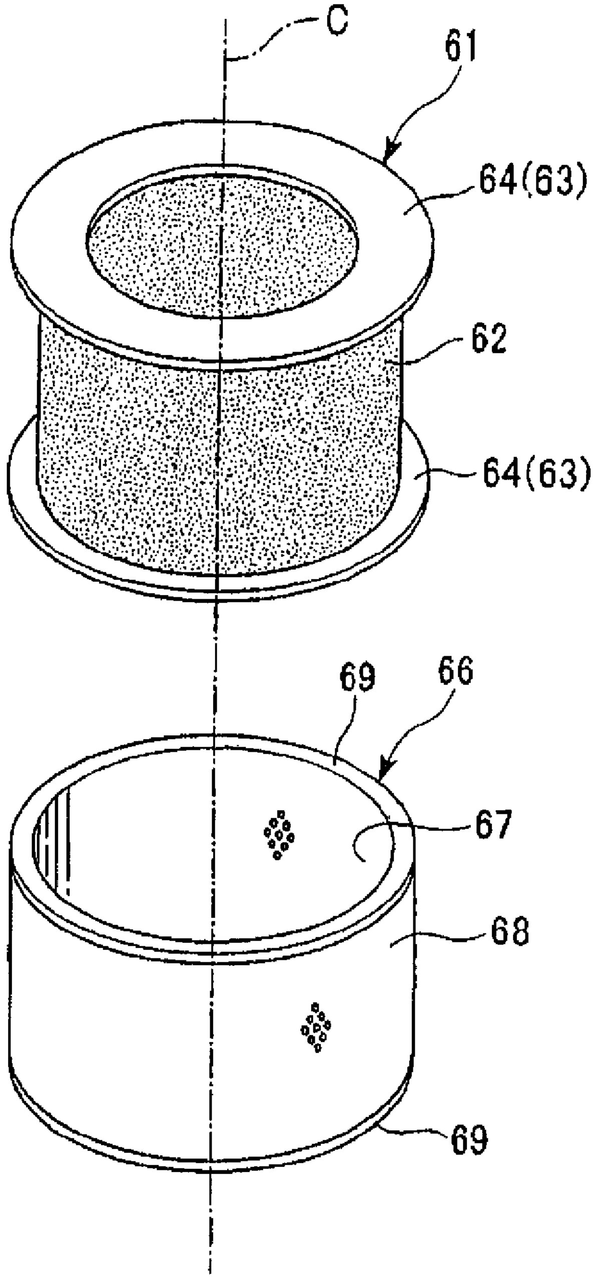
FIG. 5 is a perspective view of an element and an element holder of the air cleaner device.
Figure 6:
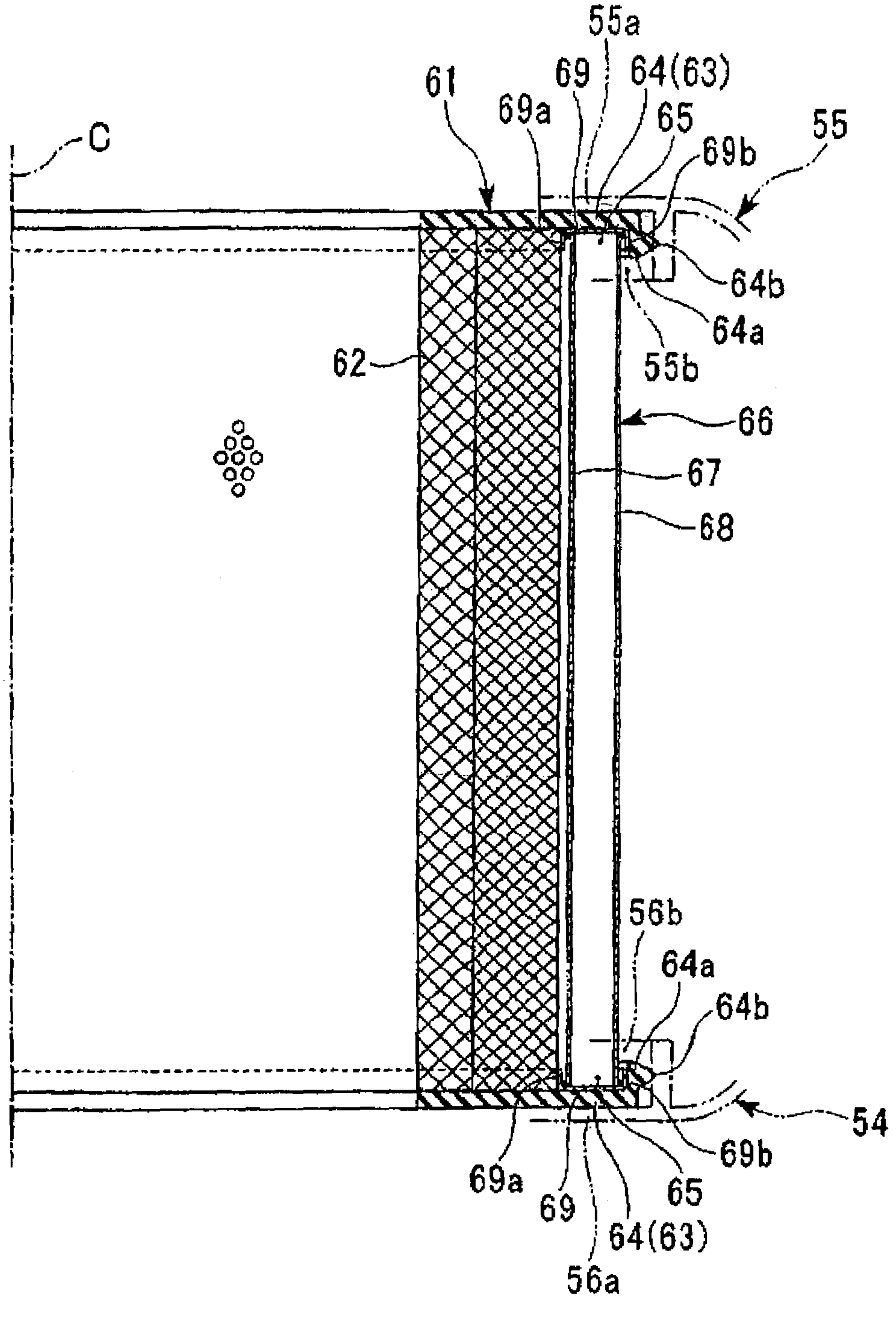
FIG. 6 is a cross sectional view taken along the axis line of the element and the element holder.

With reference to FIGS. 5 and 6 together, the element 61 is of a wet type which is used by soaking an element body 62 made of a cylindrical urethane foam in an oil and the like, can be reused after being washed with a wash oil, and has, for example, a two-layer structure in which surface roughness on the inner circumferential side is different from that on the outer circumferential side. The element 61 is accommodated in the air cleaner case 51 so that its axis line (center line) C is directed along the up-down direction. It should be noted that the element 61 and the element holder 66 in the embodiment are vertically symmetric. The element 61 is arranged between the front upper wall 55*a* and a front lower wall 56*a* of the air cleaner case 51. The collar part 52*b* of the intake duct 52 faces the inner circumferential side at an upper portion of the air cleaner element 61.

Specifically, as shown in FIGS. 3 and 4, the inner circumferential side of the element 61 is defined as a dirty side (intake air upstream side) where outside air from the intake duct 52 directly flows, and the outer circumferential side of the element 61 is defined as a clean side (intake air downstream side). When the engines 5 is operated, outside air is introduced to the inner circumferential side of the element from the intake duct 52 by a manifold air pressure, the outside air is filtered to reach the outer circumferential side of the element, and then is supplied to the engine 5 through intake nozzles 57 arranged inside a rear portion of the air cleaner case 51.

The intake nozzles 57 are provided so as to make a pair with each cylinder, and each pair is arranged in such a manner that one is located behind another. Each intake nozzle 57 extends upward from the right side of a rear lower wall of the air cleaner case 51, and then is bent leftward, and an intake air upstream end thereof is allowed to be open leftward. The intake air downstream side of each intake nozzle 57 protrudes under the air cleaner case 51, and is connected to an intake port of the engine 5 through a connecting tube (not shown), a throttle body (not shown), and the like.

It should be noted that the reference numeral 57*a* in the drawing denotes a breather hose through which the inside of the cylinder part 5*a* of the engine 5 is in communication with the inside of air cleaner case 51 on the intake air downstream side, the reference numeral 57*b* denotes a drain port for discharging oil and water inside the air cleaner case 51, the reference numeral 58*a* denotes an intake air temperature sensor, the reference numeral 58*b* denotes a vacuum sensor, the reference numeral 59*a* denotes attaching parts where the air cleaner case 51 is attached or fixed to the support frame 53 through clips and the like, and the reference numeral 59*b* denotes support parts for supporting a bumper rubber for vibration isolation of the air cleaner case 51.

As shown in FIGS. 5 and 6, support plates 63 in a disk shape with a hole which are made of an elastic member (such as rubber) are coaxially provided at respective upper and rear ends of element 61. The inner diameter of each support plate 63 is equal to that of the element body 62, whereas the outer diameter of the each support plate 63 is larger than that of the element body 62. The support plates 63 are integrally joined to upper and lower ends of the element body 62 (e.g. by welding.) The respective support plates 63 form element support parts 64 in a flange shape which expand (whose diameters increase) outside in the radius direction relative to the element body 62 at upper and lower ends of the element 61.

The element holder 66 is formed in a cylindrical shape which covers the outer circumference of the air cleaner element 61, and is accommodated in the air cleaner case 51 so that its axis line is directed in the up-down direction. The element holder 66 is arranged coaxially with the element 61, and upper and lower ends thereof are allowed to abut on the inner sides, in the axis direction, of the respective element support parts 64 so that the air cleaner element 61 is integrally supported.

The element holder 66 is formed in such a manner that inner and outer cylinders 67 and 68 in a cylindrical shape formed by using, for example, punching plates made of thin steel sheets are arranged while having a predetermined space therebetween, and also functions as a flame trap (spark arrester) which prevents the air cleaner element 61 from being stained or damaged due to flame (backfire) and the like from the engine 5.

Circular plates 69 formed by using, for example, thin steel sheets are provided at respective upper and lower ends of the element holder 66. Inner and outer flanges 69*a* and 69*b* protruding inside in the axis direction of the element holder are formed throughout the entire circumference at inner and outer circumferential edges of the respective circular plates 69. Upper and lower ends of the inner and outer cylinders 67 and 68 are fitted between the inner and outer flanges 69*a* and 69*b*, and are joined to each other using adhesive and the like, so that the integral element holder 66 is configured.

Short flanges 64*a* erecting inside in the axis direction of the element 61 are formed throughout the entire circumference at outer circumferential edges of the respective element support parts 64 (the support plates 63) in the element 61. Hereinafter, spaces between the short flanges 64*a* in the respective element support parts 64 and an edge of the element body 62 are referred to as upper and lower support concave parts 65. The element holder 66 integrally supports the element 61 in a state where upper and lower ends (the respective circular plates 69) of the element holder 66 are fitted into the upper and lower support concave parts 65.

In the case where the element 61 and the element holder 66 are integrally assembled, the followings are carried out. First, from the separated state shown in FIG. 5, one of the support plates 63 of the element 61, together with the element body 62, is inserted into the inside of the element holder 66 in a state where the support plate 63 is restorably squashed, the support plate 63 is allowed to reach the other end of the element holder 66 so as to restore the support plate 63 from the squashed state, and the upper and lower ends of the element holder 66 are inserted into the respective upper and lower support concave parts 65, so that the element 61 is supported by the element holder 66 as shown in FIG. 6.

In addition, as shown in FIGS. 3 and 4, upper and lower case-side concave parts 55*b* and 56*b* into which the upper and lower support plates 63 of the element 61 can be fitted are formed inside the case at the front upper and lower walls 55*a* and 56*a* of the air cleaner case 51. The support plates 63 are fitted into and supported by the respective case-side concave parts 55*b* and 56*b* in a state where the element 61 and the element holder 66 are accommodated in the air cleaner case 51, and the upper lid 55 is integrally attached to the case body 54.

With reference to FIG. 6, seal parts 64*b* protruding outside in the radius direction are formed throughout the entire circumference at the outer circumferences of tip ends of the short flanges 64*a* of the support plates 63. When the upper and lower support plates 63 are fitted into the upper and lower case-side concave parts 55*b* and 56*b*, the respective seal parts 64*b* are brought into close contact with the inner circumferences of the upper and lower case-side concave parts 55*b* and 56*b*.

In a state where the element 61 is supported at the inner circumference of the element holder 66 and the lower support plate 63 is fitted into the lower case-side concave part 56*b* of the front lower wall 56*a* of the case body 54, the upper lid 55 is mounted on the case body 54, and the upper support plate 63 is fitted into the upper case-side concave part 55*b* of the front upper wall 55*a*. Accordingly, the element holder 66, together with the respective element support parts 64, is sandwiched between the front upper wall 55*a* and the front lower wall 56*a* of the air cleaner case 51, and thus the element holder 66 and the element 61 are integrally held in the air cleaner case 51.

At this time, the seal parts 64*b* at the outer circumferences of the respective support plates 63 are brought into close contact with the inner circumferences of the respective case-side concave parts 55*b* and 56*b*, and the upper and lower element holding parts are sandwiched between the front upper and lower walls 55*a* and 56*a* of the air cleaner case 51 and the upper and lower ends of the element holder 66, respectively. Accordingly, spaces between the inner circumferential sides and the outer circumferential sides at the upper and lower ends of the element 61 (between the intake air upstream side and the intake air downstream side) are sealed.

As described above, the air cleaner element holding structure in the embodiment is applied to the air cleaner device 11 in which the wet and cylindrical air cleaner element 61 and the element holder 66 for supporting the element are provided in the air cleaner case 51 having the intake duct 52. The air cleaner element 61 has the element support parts 64 in a flange shape at both ends in the axis direction, and allows the intake duct 52 to face the inner circumferential side of the element, so that the inner circumferential side is defined as a dirty side, and the outer circumferential side is defined as a clean side. In the meantime, the element holder 66 has a cylindrical shape which covers the outer circumference of the air cleaner element 61, and supports the air cleaner element

61 in such a manner that both ends, in the axis direction, of the holder are allowed to abut on the insides, in the axis direction, of the element support parts 64; and the air cleaner case 51 holds the element holder 66 and the air cleaner element 61 by sandwiching the element holder 66, together with the element support parts 64, with the case body 54 and the upper lid 55.

According to the configuration, the element holder 66 covers the outer circumferential side of the air cleaner element 61, so that the element holder 66 can be functioned as the flame trap, and the number of components can be suppressed without a need of a special flame trap. Further, by detaching the upper lid 55 of the air cleaner case 51, the air cleaner element 61 and the element holder 66 are integrally detached, and thus the maintenance can be easily performed.

Further, in the air cleaner element holding structure, the element support parts 64 are formed by using elastic plates, and are formed integrally with the element body 62. Accordingly, spaces between the air cleaner case 51 and the element body 62 can be sealed through the element support parts 64.

We claim:

1. An air cleaner device, comprising:

a wet type air cleaner element having an element body and at least a pair of element support plates, one each located at an upper end and a lower end, in the axial direction, of the air cleaner element;

an air cleaner element holder having an inner cylindrical surface, an outer cylindrical surface spaced apart from said inner cylindrical surface, and at least a pair of circular plates, one each located at upper and lower ends of said element holder;

an air cleaner case formed in a relatively-long box shape extending in a front-rear direction of said air cleaner device, said air cleaner case comprising a case body and a lid, said air cleaner case accommodates said air cleaner element and said air cleaner element holder therein, and having an intake duct facing an inner circumferential side of said air cleaner element for conducting air thereto, a flange located at an outer circumferential edge of at least one element support plates projects away from a surface of said element support plates in an axial direction of said air cleaner element; and a space formed between said flange and an outer circumferential surface of said element body, wherein at least one of said circular plates is fitted into said space, wherein a diameter of an inside surface of each of said support plates is equal to an inside diameter of said air cleaner element and a diameter of an outside surface each of said support plates is larger than an outside diameter of said air cleaner element and at least one of said support plates forms an element support part having said flange, wherein said element support plates support said air cleaner element in such a manner that both ends, in the axial direction, of said element holder contact an inside surface, in the axial direction, of said element support plates and said case body and said lid of said air cleaner case sandwich said air cleaner element and said element holder therebetween, wherein a plurality of plate clips are arranged at a circumference of an upper opening in said case body, and wherein said element holder completely covers only an outer circumferential side of said air cleaner element, thereby forming a flame trap.

2. The air cleaner device according to claim 1, wherein said element support parts are formed of elastic members, and integral with said element body.

3. The air cleaner device according to claim 1, wherein said element support plates substantially seal spaces between said air cleaner case and said air cleaner element body.

4. The air cleaner device according to claim 1, wherein air flows from said inner circumferential side of said air cleaner element to an outer circumferential side of said air cleaner element.

5. The air cleaner device according to claim 1, further comprising:

a seal part projecting in a radial direction of said air cleaner element, said seal part located at an outer circumferential surface of a tip end of said flange, wherein said seal part is in close contact with an inner circumferential surface formed at a boundary of said space when said circular plate is fitted into said space.

6. The air cleaner device according to claim 1, further comprising:

a collar part formed on an air intake downstream side of the intake duct, wherein the intake duct is integrally formed with an upper wall of the air cleaner case, and the collar part penetrates the upper wall of the air cleaner case and protrudes inside the air cleaner case.

* * * * *